United States Patent

Harvey

[11] 3,961,540
[45] June 8, 1976

[54] CONVEYOR BELTS
[75] Inventor: George Arthur Harvey, Blakedown, England
[73] Assignee: U.M.E.C.-Boydell (Belting) Limited, Wolverhampton, England
[22] Filed: Aug. 6, 1975
[21] Appl. No.: 602,432

[30] Foreign Application Priority Data
Aug. 13, 1974 United Kingdom............... 35538/74

[52] U.S. Cl. ............................. 74/239; 74/231 M
[51] Int. Cl.² ...................... F16G 1/18; F16G 1/00
[58] Field of Search...... 74/231 R, 231 M X, 239 U

[56] References Cited
UNITED STATES PATENTS
1,204,816  11/1916  Pattee .............................. 74/231 R
2,199,529  5/1940  Shackelford .................. 74/231 R X
3,452,188  11/1970  Kinney, Jr. ..................... 74/239 X Primary Examiner—Leonard H. Gerin
Attorney, Agent, or Firm—Kemon, Palmer & Estabrook

[57] ABSTRACT

In a honeycomb conveyor belt the cranked or wavey belt sections extending between and pivoted to parallel transverse rods each comprises at least two metal strips which are correspondingly bent to the cranked or wavey form of the belt section and are disposed in nesting relationship with respect to one another. The transverse rods pass through the strips of the belt sections.

5 Claims, 2 Drawing Figures

U.S. Patent  June 8, 1976  3,961,540
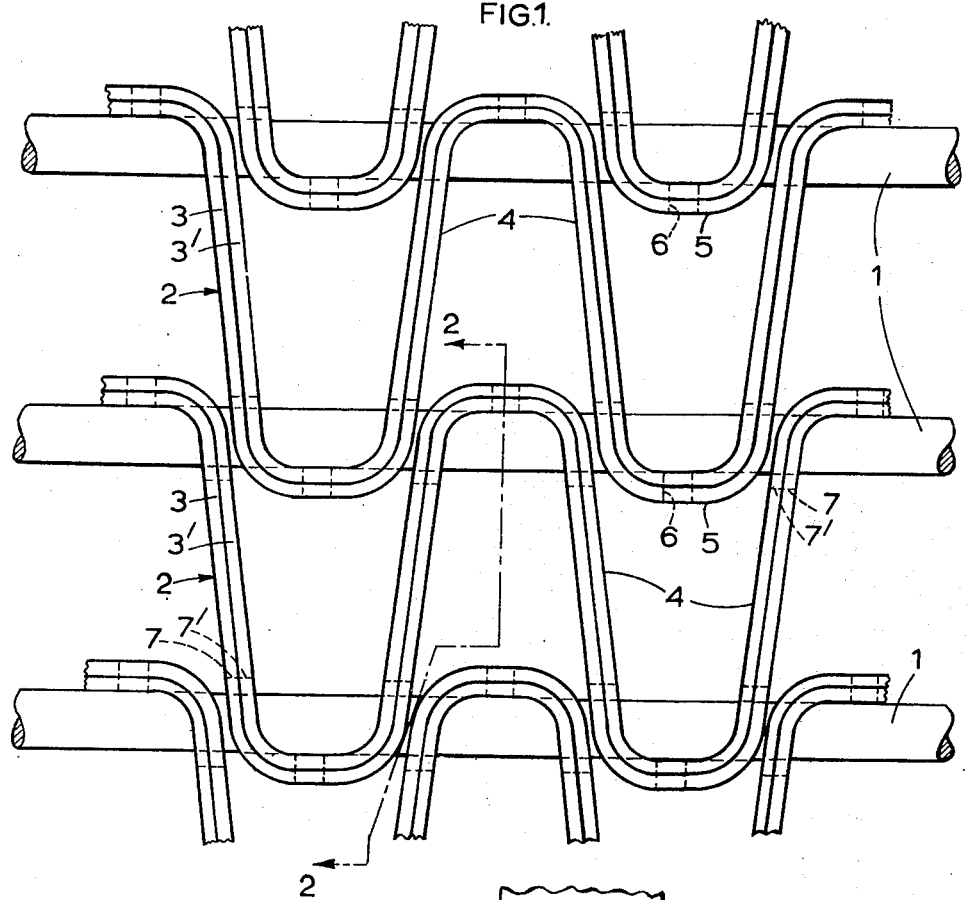
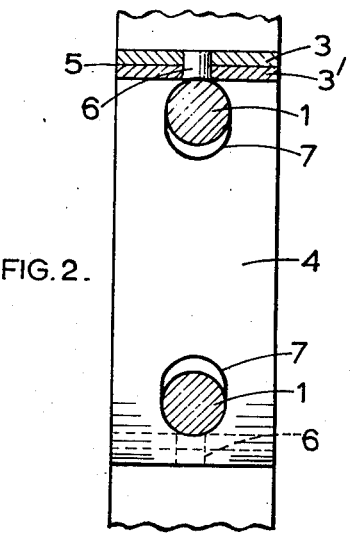

CONVEYOR BELTS

This invention relates to conveyor belts of the honeycomb type comprising a series of parallel transverse rods, and a plurality of open-work belt sections which extend between and are pivoted to the transverse rods, each belt section being of cranked or wavey form having a series of longitudinally extending members spaced apart transversely of the belt joined at their ends by transversely extending cross members, and adjacent belt sections longitudinally of the conveyor belt intermeshing with one another at the transverse rods. Such belts are hereinafter referred to as "honeycomb conveyor belts".

In honeycomb conveyor belts having belt sections made of metal, each belt section is usually made from a single length of metal strip which is bent to the cranked or wavey form. The reliability of the belts in service is largely dependent upon the strength of the belt sections, which is in turn limited by the thickness of the strip from which the belt sections are made. Bending the strip to the required form introduces weaknesses at the bends, and there is a practical limit to the thickness of strip which can be bent without being weakened unduly. Consequently the strength of belt sections, and hence of the belts in which they are included, cannot necessarily be increased merely by increasing the thickness of the strip of which the sections are made.

The present invention seeks to provide a honeycomb conveyor belt of improved strength.

The present invention consists in a honeycomb conveyor belt having belt sections which each comprise at least two metal strips of corresponding cranked or wavey form disposed in nesting relationship with respect to one another.

The multiple strip construction of each belt section gives it greater strength, and the improved strength is achieved using metal strip of a thickness within the tolerable practical limits for bending. Additionally, because of the improved strength of the belt sections, larger diameter, and thus more robust, transverse rods can be used in the belt than it has been possible to use previously for a given width of strip. It will be appreciated, therefore, that a belt of considerably improved overall strength can be obtained.

The strips of each belt section may simply nest together without being physically connected to one another, but preferably they are rigidly secured together. For example, they may be riveted together at spaced positions, such as at the cross members of the belt section, or be spot welded, or secured in any other convenient manner.

Plain registering holes may be formed in the strips for the transverse rods to pass through. Alternatively the holes may be fitted with protective bearings in which the transverse rods are journalled.

An embodiment of a honeycomb belt in accordance with the invention will now be described by way of example with reference to the accompanying drawings in which, FIG. 1 is a fragmentary plan view of part of the belt, and FIG. 2 is a section on line 2—2 of FIG. 1.

The belt has transverse rods 1 between which extend, and to which are pivoted, belt sections 2 which intermesh at the transverse rods.

Each belt section 2 comprises two steel strips 3,3' of corresponding form, each being bent to a generally cranked form having longitudinally extending members 4 and cross members 5. Adjacent longitudinal members 4 converge slightly towards one another towards the ends at which they are joined by the cross members. The two strips 3,3' nest flush against one another and are secured rigidly together at the cross members 5 by rivets 6.

Registering holes 7,7' through which the transverse rods 1 pass are formed in the strip 3,3' respectively of each belt section 2 at the ends of the longitudinal members 4 immediately next to the cross members 5. The holes 7,7' are oval with the major diameter extending lengthwise of the longitudinal members 4 so as to permit a small amount of movement of the belt sections relative to the transverse rods 1 longitudinally of the belt.

I claim:

1. A honeycomb conveyor belt comprising a series of parallel transverse rods and a plurality of open-work belt sections which extend between and are pivoted to said transverse rod, said belt sections being of cranked or wavey form having a series of longitudinally extending components spaced apart transversely of the conveyor belt joined at their ends by transversely extending cross components, adjacent belt sections longituidnally of the conveyor belt intermeshing with one another at said transverse rods which pass through said longitudinally extending components, and each said belt section comprising a plurality of metal strips correspondingly bent to said cranked wavey form of said belt section and disposed in nesting relationship with respect to one another.

2. A honeycomb conveyor belt according to claim 1 in which each said belt section comprises two of said strips.

3. A honeycomb conveyor belt according to claim 1 in which said strips of each said belt section are rigidly secured together at said cross components.

4. A honeycomb conveyor belt according to claim 1 in which said strips of each said belt section have registering oval holes in them at said longitudinal components through which said transverse rods pass, said holes being elongated in the lengthwise direction of said longitudinal components.

5. A honeycomb conveyor belt according to claim 1 in which each said belt section has bearings mounted in said strips at said longitudinal components, said transverse rods to which said belt section is pivoted being journalled in said bearings.

* * * * *